United States Patent [19]

Bundy et al.

[11] 4,158,554
[45] Jun. 19, 1979

[54] APPARATUS FOR FILTERING PARTICULATE-LADEN GASES

[75] Inventors: Richard P. Bundy, Prairie Village, Kans.; D. Bruce Zumsteg, Raytown; Lamson Rheinfrank, Jr., Kansas City, both of Mo.

[73] Assignee: Standard Havens, Inc., Kansas City, Mo.

[21] Appl. No.: 900,118

[22] Filed: Apr. 26, 1978

Related U.S. Application Data

[62] Division of Ser. No. 765,989, Feb. 7, 1977.

[51] Int. Cl.² ............................................. B01D 46/02
[52] U.S. Cl. .................................. 55/379; 55/341 R; 55/357; 55/508
[58] Field of Search .................... 55/96, 272, 273, 284, 55/287, 288, 291, 302, 303, 341 R, 356, 357, 378, 379, 508, 509, DIG. 26

[56] References Cited

U.S. PATENT DOCUMENTS

| | | | |
|---|---|---|---|
| 3,550,359 | 12/1970 | Fisher et al. | 55/341 R |
| 3,710,552 | 1/1973 | Genton | 55/341 R X |
| 3,788,046 | 1/1974 | Kaeppler et al. | 55/341 R |
| 3,849,092 | 11/1974 | Bakke et al. | 55/341 R X |
| 3,898,067 | 8/1975 | Genton | 55/379 X |
| 3,951,628 | 4/1976 | Eskijian | 55/356 X |
| 3,959,891 | 6/1976 | Burkall | 55/509 X |
| 4,056,374 | 11/1977 | Hixenbaugh | 55/378 X |
| 4,073,632 | 2/1978 | Reinauer et al. | 55/379 X |

*Primary Examiner*—Richard L. Chiesa
*Attorney, Agent, or Firm*—Lowe, Kokjer, Kircher, Wharton & Bowman

[57] ABSTRACT

A 24-hour operable baghouse plant with on-line maintenance features. The filter cartridge, comprising a tube sheet and a plurality of vertically suspended filters, includes a skeletal framework and a plurality of retaining bars traversing the bottoms of the filters to receive a stud projecting from the end cap of each filter. The tube sheet is equipped with retractable locking bars which cooperate with guide and support members attached to the housing walls to wedge the tube sheet to sealing engagement with the housing.

3 Claims, 12 Drawing Figures

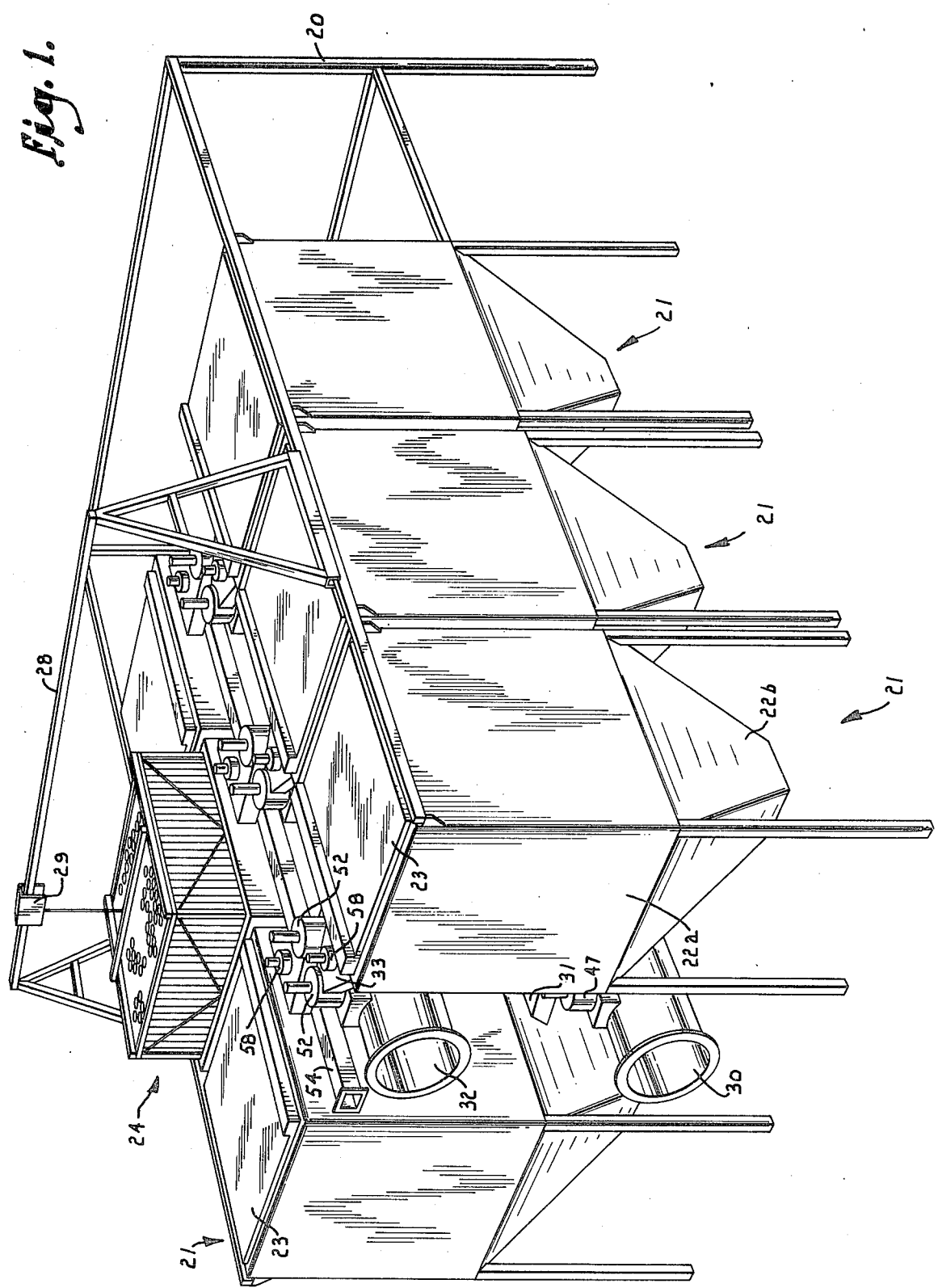

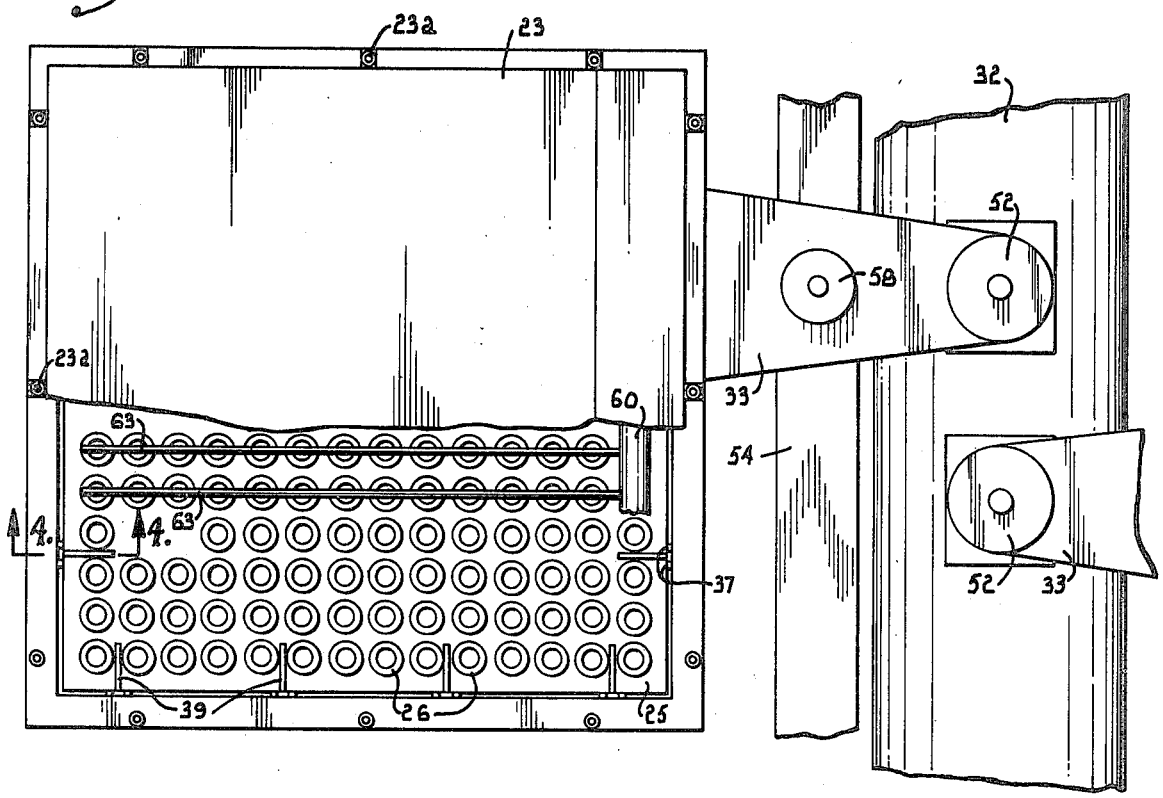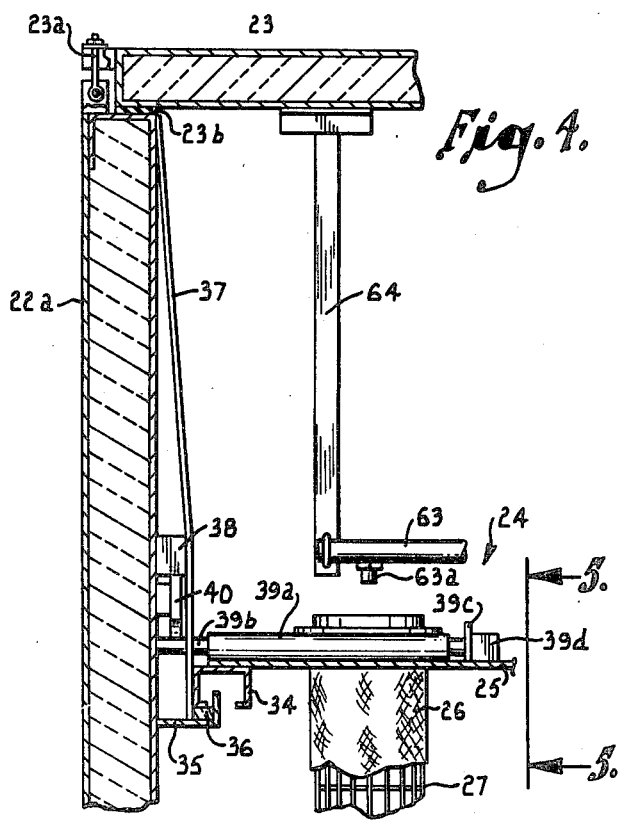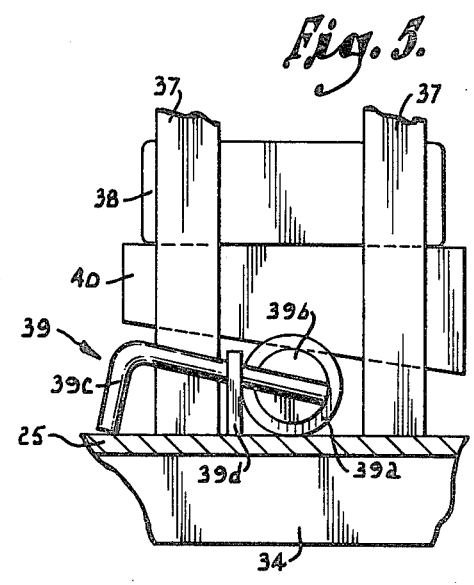

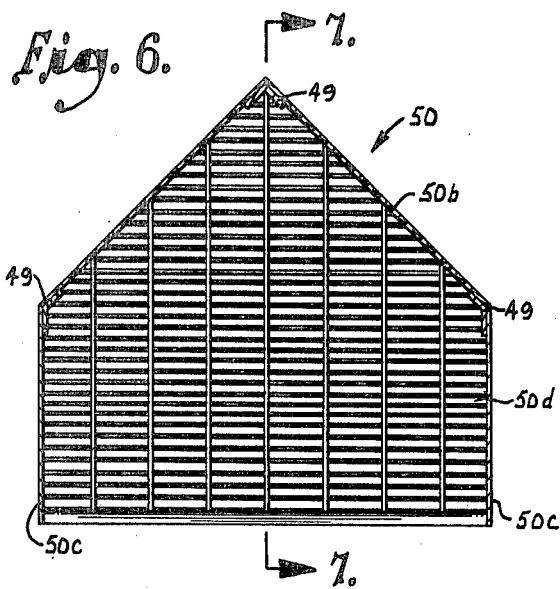
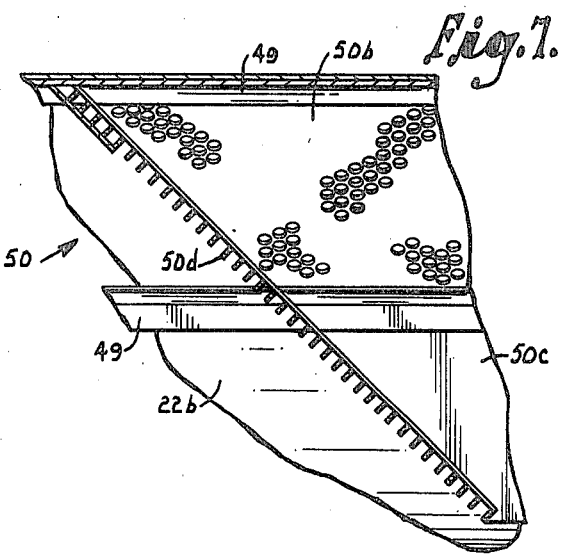
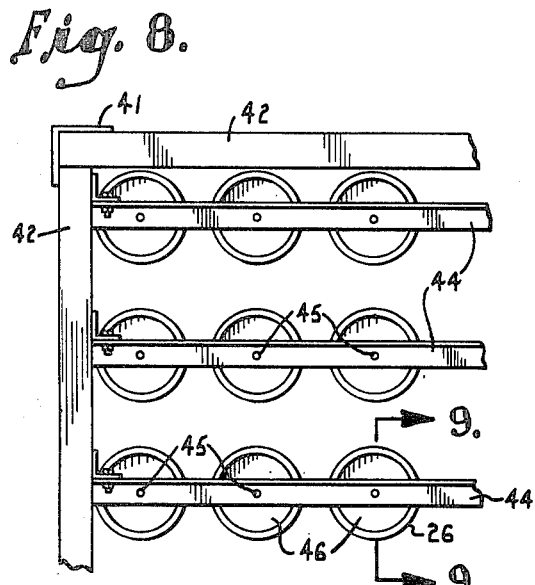
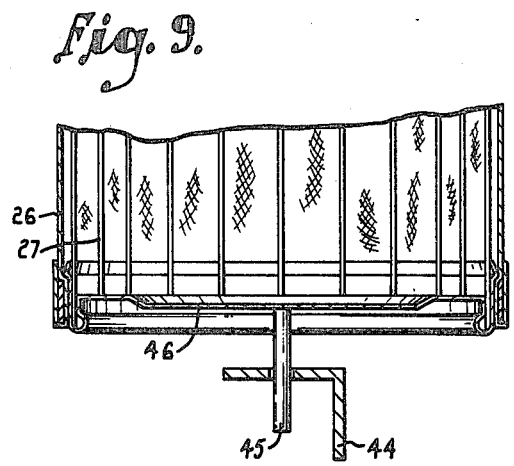
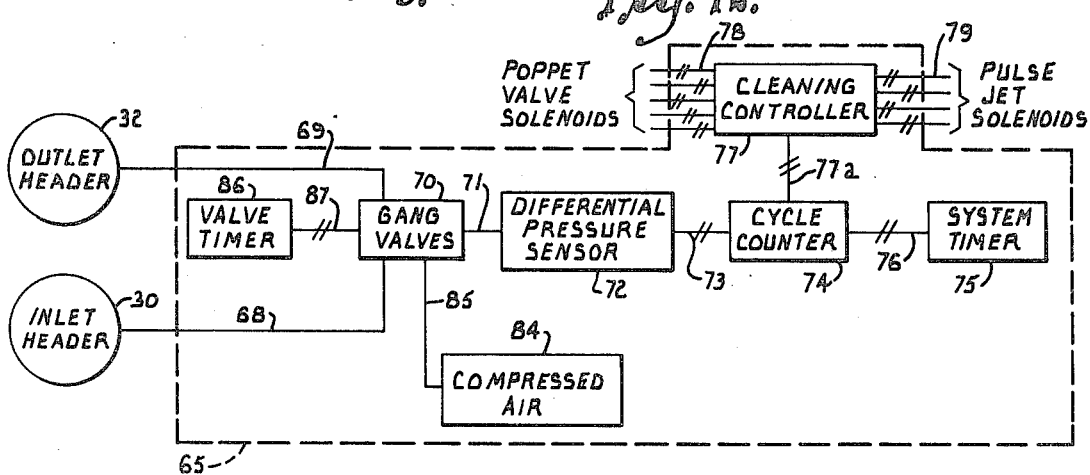

APPARATUS FOR FILTERING PARTICULATE-LADEN GASES

This is a division of application Ser. No. 765,989, filed Feb. 7, 1977.

BACKGROUND AND SUMMARY OF THE INVENTION

This invention relates to industrial baghouses and, more particularly, to an improved modularized baghouse especially adapted for on-line maintenance to permit 24-hour operation.

Continuous emphasis on environmental quality has resulted in increasingly strenuous regulatory controls on industrial emissions. One technique which has proven highly efficient in controlling air pollution has been the separation of undesirable particulate matter from a gas stream by fabric filtration.

Such filtration is carried out in dust collection apparatus known in the trade as a "baghouse" which operates on the same general principle as an ordinary household vacuum cleaner, except on a much larger scale. Basically, the baghouse includes a sheet metal housing divided into two chambers, referred to as plenums, by one or more tube sheets. Disposed within openings communicating with the plenums are fabric filters. A particle-laden gas stream, induced by the action of a fan, flows into one chamber (dirty air plenum) where dust accumulates on the fabric filter as the gas passes through the fabric into the other chamber (clean air plenum) and out the exhaust.

Although all baghouses are designed in accordance with the foregoing general principles, there are numerous operational and structural distinctions. The present invention relates to a modularized baghouse for continuous operation in a high temperature and corrosive environment. For example, boilers, kilns and furnaces may typically burn sulphur-laden coal, creating a corrosive stack gas. Plants of this genre characteristically operate around-the-clock and it is naturally desirable that the air pollution control equipment also be capable of continuous operation. A modularized baghouse made up of several filter modules filtering in parallel is particularly useful for such operation, since the majority of the modules can be left in service while maintenance is performed on those modules out of service.

Each individual module is itself a complete baghouse wherein the dirty and clean air plenums are separated by a tube sheet having a plurality of vertically suspended filter bags in which cylindrical wire cages are inserted for skeletal support. Filtration of the process gas occurs from outside to inside of the bags. As a result, baghouses constructed in this manner are normally referred to as outside bag collectors.

The effectiveness and efficiency of a modularized baghouse is directly related to the manner in which it facilitates on-line maintenance. On occasion, it is necessary to isolate an entire module for routine maintenance and inspection. During such times, it may be necessary to replace only a few bags or the entire removal of the tube sheet and associated bags may be mandatory for a complete changeout of the filters. It is desirable that the tube sheet and associated filters be removed and be replaced as a complete unit as quickly and as conveniently as possible so that the module can be brought on-stream again when needed. When inserting a new filtering unit or replacing the old unit, it is imperative that the bags be maintained in proper vertical alignment to assure proper operation and to prevent premature bag failure. Insurance of this alignment has a tendency to be time-consuming and labor intensive and, therefore, represents a significant maintenance problem.

Another maintenance difficulty resides in effectively sealing the tube sheet against the housing of the module. Failure to do so naturally results in leaks between the dirty and clean air plenums and impairs the operating efficiency of the equipment. Consequently, there is a need for an effective sealing technique which facilitates removal or installation of a complete filter unit in a baghouse module.

There are several methods for cleaning the bags to remove the filter cake which is deposited on the fabric during operation of an outside bag collector. In pulsing plenum cleaning, high pressure air is introduced into the clean air plenum and the dust cake is simultaneously dislodged from all filter bags. With pulse jet cleaning, on the other hand, a short blast of high pressure air is individually introduced to each cleaning bag. This pulse of high pressure air travels through the filter sleeve to dislodge the dust cake.

Further details of a baghouse having cages and bags suspended from a tube sheet and employing pulse jet cleaning may be found in U.S. Pat. No. 3,876,402 by Bundy et al., issued Apr. 8, 1975 and specifically incorporated herein by reference.

Although the foregoing cleaning methods are effective in removing the dust cake, they are not without drawbacks. When using high pressure air, the bags tend to snap back onto the cage after cleaning and this causes excessive wear in some bags. With emphasis on prolonging bag life and reducing maintenance requirements, there is a need for an improved cleaning method having a gentler action on the bags to reduce wear.

Rough cleaning treatment, however, is only one of the many causes of bag wear. The filters also experience excessive wear when directly impinged by a particulate-laden gas stream introduced into the dirty air plenum. In the past, this problem has chiefly been dealt with by baffling the inlet process gas, but the baffles tend to create dead or isolated spots among the bag filters, which impedes efficiency. Consequently, there is need for an effective way of distributing the inlet gas flow to prevent direct impingement of the particulate-laden stream on the filter bags.

As one might expect, there are difficulties associated with determining the appropriate time for initiating the cleaning cycle. The criteria employed is normally based on pressure drop across the tube sheet or, in the case of a modularized installation, in the pressure drop across the inlet and outlet headers. The equipment used for measuring the pressure drop typically includes a pressure differential sensor with associated pressure taps located in the inlet and outlet conduits. The pressure taps are unfortunately prone to plugging and clogging, which results in erroneous readings and generally represents an unsatisfactory basis upon which to control the cleaning process. Accordingly, there is need for an effective and reliable basis on which to initiate the cleaning cycle.

The primary object of this invention is to provide solutions to some of the foregoing problems experienced in the operation and particularly in the maintenance of industrial baghouses.

More specifically, an object of this invention is to prolong, by means of an improved construction and maintenance techniques, the life of the filter fabric used in an industrial baghouse. A correlative object is to provide a baghouse achieving prolonged filter life by reducing wear and abrasion on the filter fabric. At the heart of this goal is an improved cleaning technique adapted to gently clean the filter bags and to minimize the wear associated with vigorous flexure of the filters.

An additional object of the invention is to provide, for a modularized baghouse, a unitized tube sheet and filter construction which rigidly maintains alignment of the filter bags with respect to the tube sheet to thereby facilitate installation and removal. As an adjunct of this object, the improved construction enables preassembled shipment of the unit, since the filtering cartridge may be transported upright or on its side.

Yet another object of the invention is to provide effective means of sealing the filter unit or cartridge within the housing module in order to prevent gas leakage between the dirty and clean air plenums.

A further object of the invention is to minimize bag wear caused by impingement of particulate-laden inlet gas. A diffuser apparatus associated with the inlet to the dirty air plenum directs the incoming gas in such a manner as to prevent direct impingement on the filter bags, but at the same time eliminates any dead spots of filters as heretofore experienced with the use of a baffle construction.

Yet a further object of the invention is to provide an effective technique to initiate the cleaning cycle for a baghouse. Incorporated in such a technique is means for accurately and reliably measuring the pressure drop across the baghouse in order to initiate cleaning. Integrally part of this technique is provision for cleaning the pressure taps employed with a differential pressure sensor prior to the time of any control measurement.

Other and further objects of the invention, together with the features of novelty appurtenant thereto, will appear in the course of the following description of the drawings.

DESCRIPTION OF THE DRAWINGS

In the accompanying drawings, which form a part of the specification and are to be read in conjunction therewith, and in which like reference numerals are employed to indicate like parts in the various views:

FIG. 1 is a perspective view of a modularized baghouse constructed in accordance with a preferred embodiment of the invention;

FIG. 2 is a top plan view of one baghouse module with a portion of the top closure door broken away to better illustrate the details of the clean air plenum;

FIG. 4 is an enlarged, fragmentary sectional view of the top portion of the tube sheet taken along line 4—4 of FIG. 2 in the direction of the arrows;

FIG. 5 is an enlarged side elevational view of the locking mechanism for sealably holding the tube sheet to the baghouse wall, being taken along line 5—5 of FIG. 4 in the direction of the arrows;

FIG. 6 is an enlarged sectional view of the inlet diffuser taken along line 6—6 of FIG. 3 in the direction of the arrows;

FIG. 7 is a fragmentary sectional view of the inlet diffuser taken along line 7—7 of FIG. 6 in the direction of the arrows;

FIG. 8 is an enlarged, bottom plan view of one corner of the filter unit taken along line 8—8 of FIG. 3 in the direction of the arrows;

FIG. 9 is an enlarged sectional view through the bottom of a filter bag and cage assembly taken along line 9—9 of FIG. 8 in the direction of the arrows;

FIG. 12 is a schematic view detailing the control system to initiate a cleaning cycle and to purge the pressure taps.

Figure 3:
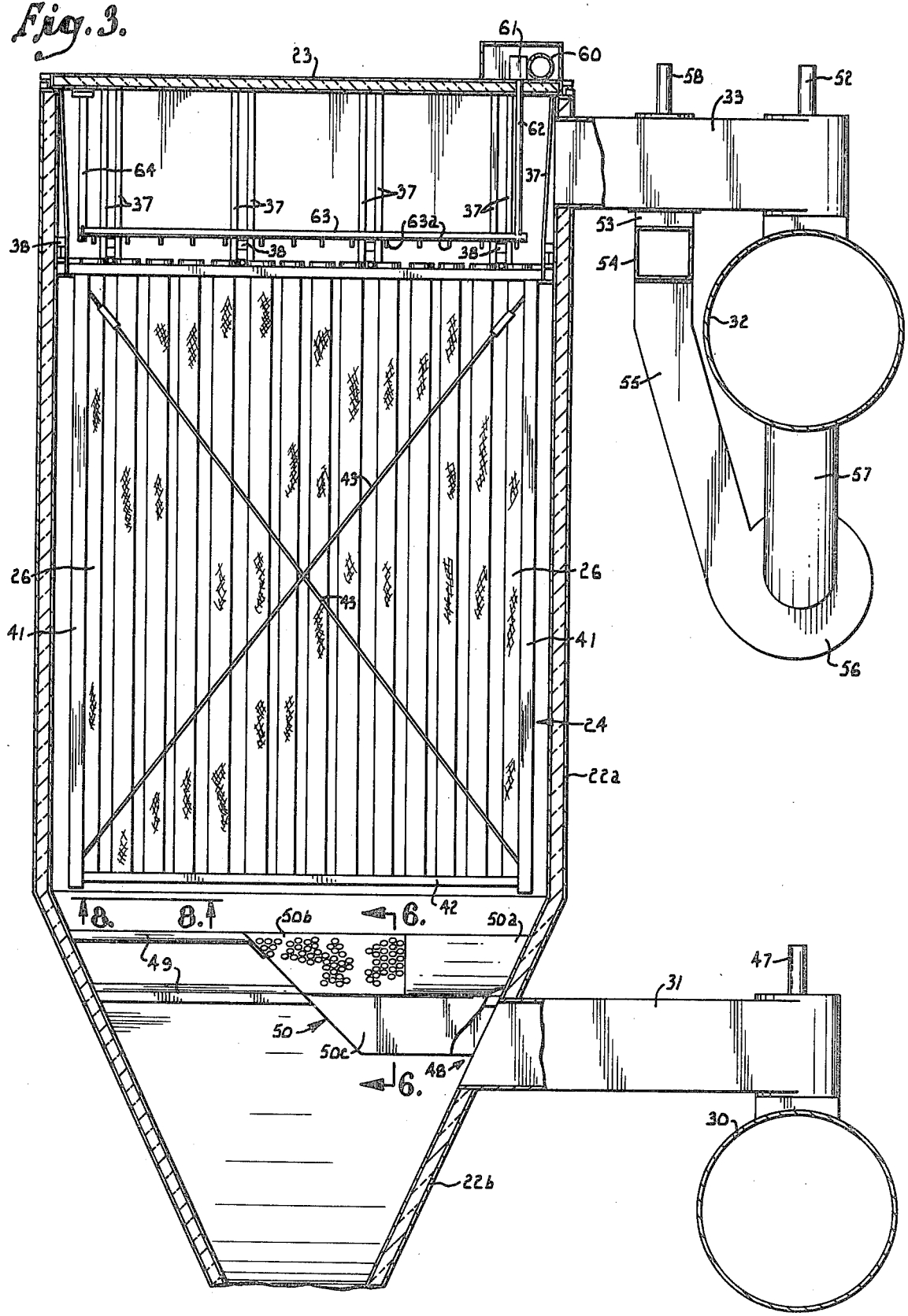
FIG. 3 is a sectional elevational view through a baghouse module.

Referring to the drawings in greater detail, attention is particularly directed to FIG. 1 illustrating a modularized baghouse plant. The plant includes a skeletal support frame 20, some of the details of which are omitted in the drawing for clarity, on which is supportedly mounted a plurality of baghouse modules arranged in two parallel rows. Each baghouse module, generally designated by numeral 21, includes an insulated, double walled housing formed as a rectangular or box-like upper section 22a joined to a hopper-shaped lower section 22b. A removable top closure door 23 covers each module 21 and is of insulated, double wall construction. Fitted interiorly of each module 21 is a filter unit or cartridge 24 comprising, as shown in the detail views, a horizontal tube sheet 25 having a plurality of holes therein in which are suspended vertically aligned filter bags 26 having cylindrical cages 27 therein for skeletal support.

A movable gantry 28 is supported on the structural framework 20 of the plant and includes a hoist 29 to aid in the removal and installation of the filter units 24 from the various modules 21.

Running centrally between the rows of baghouse modules 21 are the inlet process gas header 30 connected by ductwork 31 to the dirty air plenum of each module 21 and the outlet gas header 32 connected by ductwork 33 to the clean air plenum of each module 21 and to the prime mover fan (not shown) for pulling gas through the baghouse plant. Also disposed between the rows of modules 21 are the necessary utilities and cleaning mechanism with associated controls supportive of the operation of the baghouse, as will be later discussed in greater detail.

With particular reference to FIGS. 2-5, attention is focused on the unitary filter cartridge 24 and its mode of securement within the baghouse housing 22a. As previously suggested, the filter unit 24 includes a horizontally disposed tube sheet 25 in which are vertically suspended a plurality of filter bags 26 with their associated cages 27. Extending around the periphery of the tube sheet 25 and secured to the bottom surface thereof is an inverted u-shaped channel 34. Secured around the interior perimeter of the wall in the upper section 22a and spaced downwardly from the upper end thereof is a trough 35 containing a sealing gasket 36 on which rests one leg of the u-shaped channel 34 underlying the tube sheet 25 (FIG. 4).

At various points around the perimeter of the upper section housing 22a are paired guide straps 37 which are flush with the interior surface of the baghouse wall 22a at the upper edge thereof and which are angled outwardly and spaced apart from the wall 22a where the lower end of the strap 37 is received in the trough 35. Intermediate the ends of the straps 37, a spacer block 38 is secured to the interior side of the housing wall 22a and to the back side of the straps 37. The function of the angled straps 37 therefore is to engage the peripheral channel 34 of the tube sheet 25 and to guide it into proper position for alignment with the trough 35 when the filter unit 24 is lowered from above.

At various points around the edge of the tube sheet 25 are located locking members 39. Each locking member 39 comprises a tubular sleeve 39a secured to the upper surface of the tube sheet 25 and which slidably and rotatively receives therein a locking bar or rod 39b having a handle 39c secured to the inner end thereof. An upstanding ear or stop 39d is secured to the upper face of the tube sheet 25 such that the handle 39c may be rotatively positioned adjacent the stop 39d when the locking rod 39b is extended outwardly from the edge of the tube sheet 25 to thereby prevent retraction of the rod 39b. With the locking rod 39b in the extended position, a wedge 40 is disposed between the outer end of the bar 39b and the spacer block 38 to provide a downward biasing force on the tube sheet 25, causing sealing engagement with the channel member 34 against the sealing gasket 36.

Operationally, therefore, the filter unit 24 may be lowered into an empty housing 22a with the aid of the hoist 29 and movable gantry 28 after removal of the cover door 23 by loosening of the keeper bolts 23a. On initial installation, it should be noted the locking mechanisms 29 are retracted such that the handle 39c thereof is rotated out of engagement with the stop 39d and the locking bolt 39b is retracted so as not to extend outwardly from the edge of the tube sheet 25. The unit 24 is thus lowered into the housing 22a and is guided into proper position when the channel members 34 of the tube sheet 25 engage the guide straps 37. When the filter unit 24 is fully lowered into the baghouse so the channel member 34 is received in the trough 35, the locking members 39 may be extended by sliding the locking bolts 39b outwardly and rotatively positioning the handle 39c behind the stop plate 39d. The wedge 40 is then inserted between the locking bolt 39b and the spacer block 38 and driven by a hammer or similar tool to bias the tube sheet 25 downwardly. The door 23 may then be re-installed and the keeper bolts 23a tightened to seal peripheral gasket 23b to the upper edge of the housing 22a.

Access to individual filter bags 26 and associated cages 27 may be had from the top of the tube sheet 25 when the door is removed. When it is necessary, on the other hand, to remove the entire filter unit 24, the wedges 40 are removed and the locking bolts 39b moved to a retracted position. The hoist 29 may then be coupled to the unit 24 and it may be raised from the module housing 22a. Once the unit 24 is elevated above the housing, the movable gantry 28 can be repositioned at one end of the framework 20 so that the unit 24 can be lowered by hoist 29 to the ground.

As shown in FIG. 3, the filter unit 24 also includes framing members comprising vertical struts 41 at the lower ends thereof. Cross braces 43 are included for additional structural rigidity. Referring then to FIG. 8, removably connected across the bottom of the unit 24 to opposed horizontal struts 42 are parallel retaining bars 44 being aligned with the rows of bags 26 and cages 27. Each retaining bar 44 includes spaced holes therethrough which receive a stud 45 centrally secured to and projecting downwardly from the bottom closure pan 46 capping the lower end of each bag 26 and cage 27 assembly. Constructed in such manner, the bag-cage assemblies are supported and fully maintained in proper alignment by connection at their upper ends to the tube sheet 25 and at their lower ends by the retaining bars 45. In addition to maintaining proper alignment of the bags 26 to insure peak filtering and cleaning efficiency, this feature also permits the entire filter cartridge 24 to be shipped on its side or upright without damage to the filters 26 themselves.

Attention is now directed to the inlet diffuser illustrated in FIGS. 3, 6 and 7. Each baghouse module 21 is connected to the inlet header 30 by means of an inlet conduit 31 containing a poppet valve 47 which may be opened and closed to emit or restrict gas flow from the inlet header 30 into the dirty air plenum. The conduit 31 is connected to the module 21 through the hopper-shaped portion 22b of the housing to provide an inlet port 48 beneath the lower ends of the filter bags 26. Secured interiorly of the hopper housing 22b on support braces 49 and positioned adjacent the inlet port is a specially configured diffuser 50. The diffuser 50 includes a hip roof having an impervious portion 50a adjacent the sloped hopper wall 22b and a foraminous portion 50b joined to the impervious portion 50a and extending outwardly therefrom. Depending from the outer edges of the hip roof 50a&b are vertical side walls 50c extending alongside the inlet port 48. The inner end of the diffuser 50 (that is, the end extending substantially centrally of the hopper section 22b) comprises an inclined wall 50d inclined in a direction opposite that of the hopper wall 22b containing the inlet port 48. The end wall 50d of the diffuser 50 is constructed of bar grating comprising a plurality of parallel slats being inclined with respect to the longitudinal axis of the inlet port 48.

Accordingly, a particulate-laden gas stream introduced through the inlet port 48 strikes the end wall bar grating 50d and is deflected downwardly into the hopper 22b. This deflection causes some of the particulate matter to drop out in the bottom of the hopper 22b before the gas ever reaches the filter unit 24. While the bar grating 50d takes the main thrust of the incoming gas stream, the hip roof is perforated throughout the interior portion 50b thereof so as to prevent any dead or isolated spots in the filter cartridge 24. By removing the inlet port 48 from the vertical side wall of the baghouse housing (i.e., wall 22a in the drawings) as heretofore taught in the art to the hopper bottom 22b and by providing a diffuser 50, direct impingement of a particulate-laden gas stream upon the filter unit 24 is eliminated, thus prolonging bag life.

Figure 10:
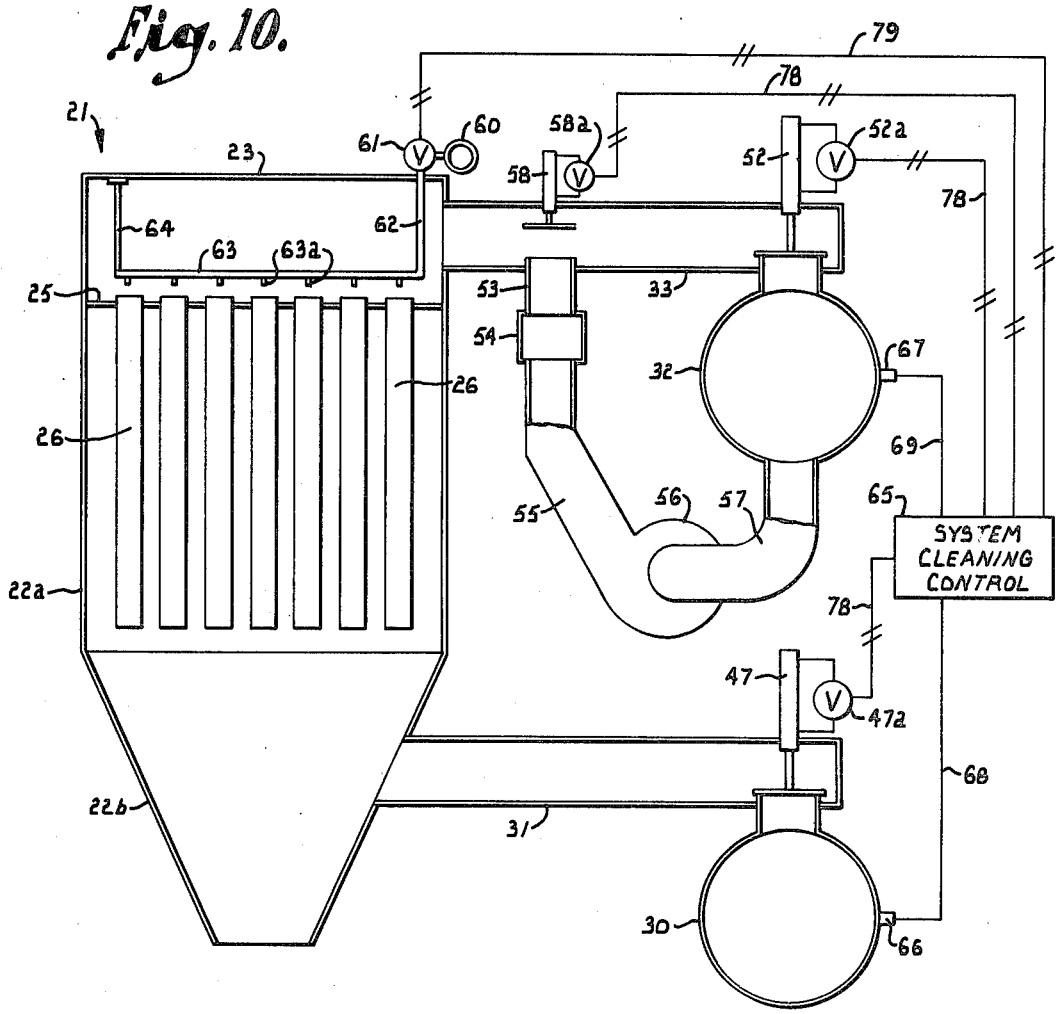
FIG. 10 is a side sectional, partly schematic, view of a single baghouse module with cleaning cycle controls.
Figure 11:
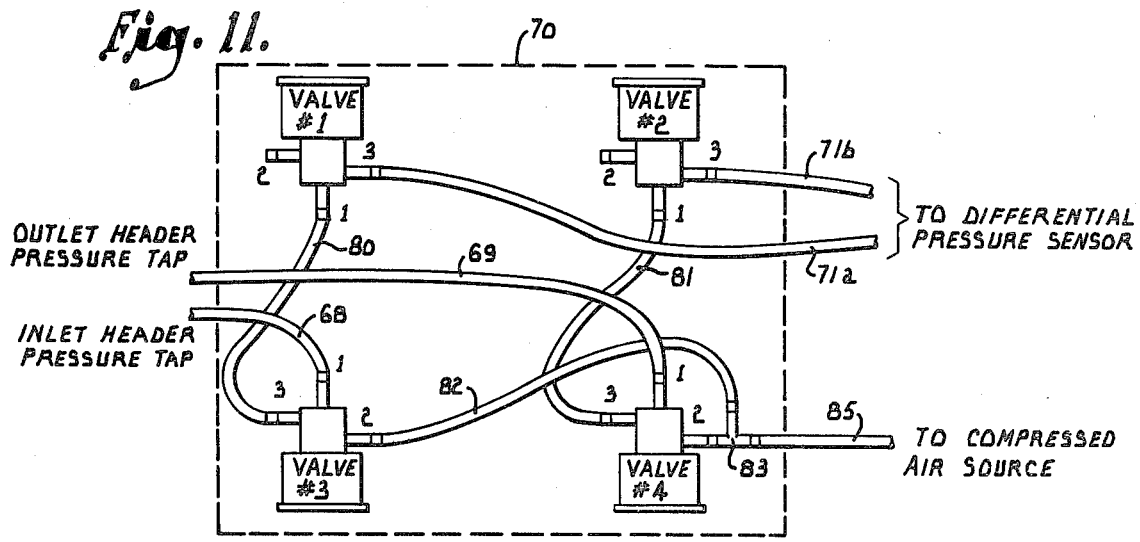
FIG. 11 is a schematic view illustrating gang valves for purging the pressure taps prior to control measurement by the pressure sensor.

With reference to FIGS. 10–12, the dual function cleaning system servicing the baghouse plant is now described in detail. Attention is first focused on the high volume, low pressure reverse air system.

As previously suggested, the dirty air plenum of each module 21 is connected by an inlet conduit 31 containing a poppet valve 47 to the inlet gas header 30. The poppet valve 47 is pneumatically activated and controlled by an electric solenoid valve 47a. Likewise, the clean air plenum is connected to the outlet header 32 by an outlet conduit 33 containing a poppet valve 52 which may be opened and closed to emit or restrict gas flow from the clean air plenum to the outlet header 32. The poppet valve 52 is pneumatically activated and controlled by an electric solenoid valve 52a. The outlet conduit 33, intermediate the clean air plenum and the outlet poppet valve 52 is fitted with an interconnecting conduit 53 which is, in turn, connected to a horizontally disposed manifold 54 running the length of the modules 21. The manifold 54 is connected by conduit 55 to the exhaust side of a high volume, low pressure air fan 56. The suction side of the fan 56 is connected by ductwork 57 to the outlet header 32 so as to draw warm air from the outlet stream for cleaning purposes as will be seen. Alternatively, the suction side of the fan 56 may operate on atmospheric air. The interconnecting conduit 53 which communicates with the outlet conduit 33 and the manifold 54 is equipped with a pneumatically activated poppet valve 58 controlled by a solenoid 58a.

The baghouse plant also incorporates a jet pulse cleaning system. The pulse jet cleaning equipment includes a compressed air header 60 servicing each of the modules 21. Each module 21 includes a piping network connected by one or more solenoid valves 61 to the compressed air header 60. The piping network has vertical pipes 62 communicating with the control valves 61 and a plurality of horizontal pipes 63 supportingly suspended from the closure door 23, as by brackets 64, above the rows of tubes. Each horizontal pipe 63 is positioned above a row of bags 26 and includes a plurality of downwardly directed nozzles 63a centrally aligned with the mouths of the filter bags 26.

Further details of pulse jet cleaning apparatus and operation thereof may be found in U.S. Pat. No. 3,876,402, previously incorporated by reference.

Reference is now made to FIG. 12 for an explanation of the system cleaning control which is generally designated by numeral 63 in FIG. 10. The inlet and outlet headers 30 and 32 are respectively fitted with pressure taps 66 and 67 which are connected by pneumatic lines 68 and 69 to a gang valve set designated generally as numeral 70 and shown in detail in FIG. 11. The gang valves 70 are pneumatically connected, as schematically indicated by line 71, to a differential pressure sensor 72 for sensing the pressure drop across the inlet and outlet headers 30 and 32. The sensor 72 is electrically connected (schematic line 73) to an adjustable cycle counter 74 which, in turn, is connected both to an adjustable system timer 75 as indicated by line 76 and to a cleaning controller 77 as indicated by line 78. The controller 77 is equipped with a plurality of electrical connections 78 to operate the poppet valve solenoids 47a, 52a and 58a throughout the plant and with a plurality of electrical connections 79 to operate the solenoids 61 for pulse jet cleaning.

So controlled, a cleaning cycle may be initiated by the system timer 75 after a preselected time lapse or by the differential pressure sensor 72 when the pressure drop across the inlet and outlet headers 30 and 32 goes above a preselected set point. It will be understood that during normal filtering operation the poppet valve 58 associated with the reverse air fan 56 is closed, while the poppet valves 47 and 52 associated with the inlet and outlet headers 30 and 32 are open. In this mode, particulate-laden gas flows through the inlet header 30 to the inlet conduit 31 and into the dirty air plenum. As the gas passes through the fabric of the filter unit 21, dust collects on the outside thereof and clean gas passes centrally through each filter bag 26 and out the mouth to the clean air plenum. From the clean air plenum, the clean gas flows through the outlet conduit 33 and into the outlet header 32. When a cleaning cycle is initiated, each module 21 is isolated in series and cleaned with reverse air as follows. First, the poppet valves 47 and 52 associated with the inlet and outlet headers 30 and 32 are closed to completely isolate the module 21. The poppet valve 58 connected with the reverse air manifold 54 is opened and a high volume of low pressure air supplied by fan 56 flows from the manifold 54 through the connection fitting 53 into the outlet conduit 33 and the clean air plenum. The cleaning air then flows into the bags 26, causing them to expand from their cages 27 and breaking up the accumulated dust cake on the filtration surface. The dust cake falls into the module hopper 22b and may be disposed of by conventional means. Because the cleaning air is low pressure, but of a large volume, the bags 26 gently billow and when the poppet valve 58 is closed the bags 26 gently return to their supporting cages 27 instead of vigorously shaping back as would be the case if the module 21 were on-line (i.e., filtering process gas). Thereafter, the inlet and outlet poppet valves 47 and 52 may be opened to resume on-line filtration as a subsequent module 21 is cleaned with reverse air. When each module 21 has been cleaned with reverse air, the reverse air cycle is completed. If the pressure drop is not within limits, subsequent reverse air cycles are then initiated as determined by the cycle counter 74 for which the count has been set by plant personnel. If, after the counter 74 has been satisfied, the pressure drop across the inlet and outlet headers 30 and 32 still exceeds the set point of the differential pressure sensor 72, a pulse jet cleaning cycle is activated by the controller 77.

Pulse jet cleaning can be accomplished with the module 21 functioning in a filter mode, or with the module 21 isolated by closing the inlet and outlet poppet valves 47 and 52. It is preferable, however, to conduct the pulse jet cleaning with the module 21 isolated, since more effective cleaning of the bags 26 is achieved by operation in this manner. In pulse jet cleaning, a blast of high pressure air is delivered from the compressed air header 60 by activation of solenoid valve 61 to the horizontally disposed pipes 63 and nozzles 63a overlying the mouths of the bags 26. A vigorous pulse of high pressure air travels through the bag 26 to dislodge the dust cake and the bag 26 snaps back on its support cage 27. Subsequent cycles of pulse jet cleaning may be initiated by plant personnel until the desired system pressure drop is within limits.

This invention further provides a purge system for periodically cleaning the pressure taps 66 and 67 of any dust accumulation in order to insure accurate measurements by the differential pressure sensor 72. The purge system, the heart of which is shown in FIG. 11, includes a gang valve set 70 of four electrically activated solenoid valves numbered #1–4. Valves #1 and #3 are serially connected in the flexible pneumatic tubing between the inlet header tap 66 and the differential pressure sensor 72, while valves #2 and #4 are serially connected between the sensor 72 and the outlet header tap 67. More specifically, valve #1 is connected at its port 3 by tubing 71a to the sensor 72. Tubing 80 interconnects port 1 of valve #1 with port 3 of valve #3 and then port 1 of valve #3 is connected by tubing 68 to the inlet header tap 66. Likewise, port 3 of valve #2 is connected by tubing 71b to the differential pressure sensor 72. Tubing 81 interconnects port 1 of valve #2 with port 3 of valve #4, while port 1 of valve #4 is connected by tubing 69 to the outlet pressure tap 67. Ports 2 of valves #1 and #2 communicate with atmosphere. Port 2 of valve #3 is connected via line 82 and port 2 of valve #4 is connected through a T-junction 83 to a compressed air source 84 by air line 85. As illustrated in FIG. 12, activation of the gang valves 70 is controlled by a valve timer 86 through an electrical connection 87.

In operation, ports 2 of valves #1-4 are normally open so that the sensor 72 is connected through the associated tubing network to measure the pressure drop across the inlet and outlet headers 30 and 32. Periodically, as determined by the valve timer 86, the differential pressure sensor 72 is isolated by the gang valves 70 and pressure taps 66 and 67 are purged with compressed air to remove any dust accumulation. In the operational mode, ports 3 of the valve #1-4 are closed to isolate and to prevent damage to the differential pressure sensor 72. All ports 1 remain open and ports 2 of valves #1-4 are opened so compressed air flows through ports 1 and out ports 2 of valves #3 and #4 to blow out the lines 68 and 69 and the pressure taps 66 and 67 associated with the inlet and outlet headers 30 and 32. Ports 2 of valves #1 and #2 open to atmosphere to vent lines 80 and 81. This prevents any damage to the sensor 72 which might otherwise be caused by positive pressure leakage through ports 3 of valves #3 and #4, since the sensor 72 normally measures small pressure differentials, such as inches of water, and the compressed air is of a significantly larger magnitude, such as pounds per square inch. After purging of the pressure taps 66 and 67 and associated lines 68 and 69, the ports 2 of valves #1-4 are closed and all ports 3 are again opened (all ports 1 remaining open) to reconnect the pressure sensor 72 across the inlet and outlet headers 30 and 32.

From the foregoing, it will be seen that this invention is one well adapted to attain all ends and objects hereinabove set forth, together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A baghouse comprising:
    an open top housing;
    a closure member to removably seal the top of said housing;
    a removable filter cartridge insertable in said housing, said cartridge including a tube sheet having a plurality of gas passages therethrough and a plurality of filtering assemblies associated with said gas passages;
    a tube sheet support surface installed interiorly of said housing around the perimeter thereof;
    a resilient seal disposed atop said support surface;
    a plurality of stops secured interiorly of said housing above said support surface; and
    releasable locking means including a plurality of retractable bars mounted on the upper surface of said tube sheet and extendable to underlie said stops, and inclined blocks wedged between said stops and bars to bias said tube sheet to engagement with the resilient seal of said support surface.

2. The baghouse as in claim 1, said releasable locking means further including tubular sleeves secured to the upper surface of said tube sheet to slidably receive said retractable bars.

3. The baghouse as in claim 1, including an inclined guide surface sloped from the top of said housing outwardly from the interior of said housing to said support surface whereby said guide surface is engageable with the edge of said tube sheet as said filter cartridge is lowered into said housing to guide said filter cartridge in proper position to rest on said support surface.

* * * * *